(12) United States Patent
Tuulos et al.

(10) Patent No.: US 9,900,512 B2
(45) Date of Patent: Feb. 20, 2018

(54) APPARATUS, METHOD AND COMPUTER PROGRAM FOR IMAGE STABILIZATION

(71) Applicant: Nokia Technologies Oy, Espoo (FI)

(72) Inventors: Eero Tuulos, Vuorentausta (FI); Juuso Gren, Kyrokoski (FI); Mikko Muukki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 146 days.

(21) Appl. No.: 14/778,330

(22) PCT Filed: Mar. 18, 2013

(86) PCT No.: PCT/FI2013/050304
§ 371 (c)(1),
(2) Date: Sep. 18, 2015

(87) PCT Pub. No.: WO2014/147285
PCT Pub. Date: Sep. 25, 2014

(65) Prior Publication Data
US 2016/0057353 A1    Feb. 25, 2016

(51) Int. Cl.
*H04N 5/228*     (2006.01)
*H04N 5/232*     (2006.01)
*G03B 5/00*     (2006.01)
*G02B 27/64*     (2006.01)

(52) U.S. Cl.
CPC ....... *H04N 5/23287* (2013.01); *G02B 27/646* (2013.01); *G03B 5/00* (2013.01); *H04N 5/23258* (2013.01); *H04N 5/23267* (2013.01); *G03B 2205/0007* (2013.01)

(58) Field of Classification Search
None
See application file for complete search history.

(56) References Cited

U.S. PATENT DOCUMENTS

2010/0245603 A1   9/2010   Hashi et al. ............... 348/208.5
2011/0141298 A1   6/2011   Nishiyama ............... 348/208.99

FOREIGN PATENT DOCUMENTS

JP     2006-203504 A     8/2006

*Primary Examiner* — Stephen Coleman
(74) *Attorney, Agent, or Firm* — Harrington & Smith

(57) ABSTRACT

An apparatus including an image sensor configured to capture an image and optics, wherein the image sensor and optics align along an optical axis; optical image stabilization circuitry configured to determine and apply a target optical adjustment to compensate during capture of an image, for movement of the optical axis as a consequence of detected movement of the apparatus; post-capture image stabilization circuitry configured to process the captured image using a residual optical adjustment to obtain a compensated captured image, wherein the residual optical adjustment depends upon a difference between a measured optical adjustment, achieved during capture of the image, and the determined target optical adjustment.

25 Claims, 3 Drawing Sheets

APPARATUS, METHOD AND COMPUTER PROGRAM FOR IMAGE STABILIZATION

TECHNOLOGICAL FIELD

Embodiments of the present invention relate to image stabilization.

BACKGROUND

Ideally, during the exposure period when an image is captured, each pixel of the imaged scene is focused by the camera optics onto a particular sensel of the camera sensor.

However, if the camera moves during the exposure period the pixels from the imaged scene may be focused by the optics not only onto their particular sensels but also other sensels. This may create blurring in a rendered image.

This problem becomes greater when long exposure periods are used.

This problem has typically been addressed either by using 'at-capture' image stabilization such as optical image stabilization or 'post-capture' image stabilization such as electrical image stabilization or digital image stabilization.

Optical image stabilization adjusts the configuration of the camera during the exposure period so that movement of the camera is at least partially compensated. The purpose of optical image stabilization is to make adjustments to the configuration of the camera during the exposure period to try and direct the pixels from the imaged scene on to only their own particular sensels.

In contrast, digital image stabilization may, for example, track movement of the scene relative to the image sensor at a macro-level. Using digital image processing the consequence of this movement on the high resolution image can be at least partially filtered out of the captured high resolution image. A series of low resolution images, captured simultaneously with a high resolution (longer exposure) image may be used to track movement of the scene, for example.

Electronic image stabilization may, for example, track movement of the scene relative to the image sensor at a macro-level. The image may be shifted in the image plane, frame by frame, so that wobble is removed.

BRIEF SUMMARY

These approaches are not wholly satisfactory and it would be desirable to develop a new approach.

According to various, but not necessarily all, embodiments of the invention there is provided an apparatus comprising: an image sensor configured to capture an image and optics, wherein the image sensor and optics align along an optical axis; optical image stabilization circuitry configured to determine and apply a target optical adjustment to compensate during capture of an image, for movement of the optical axis as a consequence of detected movement of the apparatus; post-capture image stabilization circuitry configured to process the captured image using a residual optical adjustment to obtain a compensated captured image, wherein the residual optical adjustment depends upon a difference between a measured optical adjustment, achieved during capture of the image, and the determined target optical adjustment.

According to various, but not necessarily all, embodiments of the invention there is provided a method comprising: performing optical image stabilization by: detecting movement of apparatus; determining target optical adjustment to compensate during capture of an image, for relative movement of the optical axis as a consequence of the detected movement of the apparatus; using the target optical adjustment during capture of the image and then performing post-capture image stabilization by: measuring an obtained optical adjustment that at least partially compensates during capture of an image for relative movement of the optical axis as a consequence of the movement of the apparatus; using the target optical adjustment and the obtained optical adjustment to determine a residual optical adjustment indicative of a difference between the target optical adjustment and the obtained optical adjustment; and processing the captured image using the residual optical adjustment to obtain a compensated captured image.

According to various, but not necessarily all, embodiments of the invention there is provided an apparatus comprising: optical image stabilization circuitry configured to determine and apply a target optical adjustment to compensate during capture of an image of a scene, for relative movement of an image sensor as a consequence of detected movement; and residual optical adjustment circuitry configured to determine and store a residual optical adjustment for obtaining a compensated captured image via processing, wherein the residual optical adjustment depends upon a difference between a measured optical adjustment, achieved during capture of the image, and the determined target optical adjustment.

According to various, but not necessarily all, embodiments of the invention there is provided a method comprising: determining and applying a target optical adjustment to compensate during capture of an image of a scene, for relative movement of an image sensor as a consequence of detected movement; and determining and storing a residual optical adjustment for obtaining a compensated captured image via post-capture processing, wherein the residual optical adjustment depends upon a difference between a measured optical adjustment, achieved during capture of the image, and the determined target optical adjustment.

According to various, but not necessarily all, embodiments of the invention there is provided an apparatus comprising: post-capture processing circuitry configured to process a captured image using a residual optical adjustment to obtain a compensated captured image, wherein the residual optical adjustment depends upon a difference between a determined target optical adjustment determined as a target for achieving optical image stabilization and a measured optical adjustment, achieved as a consequence of optical image stabilization during capture of the image.

According to various, but not necessarily all, embodiments of the invention there is provided a method comprising: processing a captured image using a residual optical adjustment to obtain a compensated captured image, wherein the residual optical adjustment depends upon a difference between a determined target optical adjustment determined as a target for achieving optical image stabilization and a measured optical adjustment, achieved as a consequence of optical image stabilization during capture of the image.

According to various, but not necessarily all, embodiments of the invention there is provided an apparatus comprising: at least one processor; and at least one memory including computer program code, the at least one memory and the computer program code configured to, with the at least one processor, cause the apparatus at least to perform: processing a captured image using a residual optical adjustment to obtain a compensated captured image, wherein the residual optical adjustment depends upon a difference between a determined target optical adjustment determined as a target for achieving optical image stabilization and a measured optical adjustment, achieved as a consequence of optical image stabilization during capture of the image.

According to various, but not necessarily all, embodiments of the invention there is provided an apparatus comprising: an image sensor configured to capture an image and optics, wherein the image sensor and optics align along an optical axis; optical image stabilization circuitry configured to determine and apply a target optical adjustment to compensate during capture of an image, for movement of the optical axis as a consequence of detected movement of the apparatus; and control circuitry configured to use a residual optical adjustment to obtain a captured image, wherein the residual optical adjustment depends upon a difference between a measured optical adjustment, achieved during capture of the image, and the determined target optical adjustment.

According to various, but not necessarily all, embodiments of the invention there is provided a method comprising: performing optical image stabilization by: detecting movement of apparatus; determining target optical adjustment to compensate during capture of an image, for relative movement of the optical axis as a consequence of the detected movement of the apparatus; using the target optical adjustment during capture of the image and measuring an obtained optical adjustment that at least partially compensates during capture of an image for relative movement of the optical axis as a consequence of the movement of the apparatus; using the target optical adjustment and the obtained optical adjustment to determine a residual optical adjustment indicative of a difference between the target optical adjustment and the obtained optical adjustment; and using the residual optical adjustment to obtain a captured image.

According to various, but not necessarily all, embodiments of the invention there is provided an apparatus comprising: circuitry configured to use a residual optical adjustment to obtain a captured image, wherein the residual optical adjustment depends upon a difference between a determined target optical adjustment determined as a target for achieving optical image stabilization and a measured optical adjustment, achieved as a consequence of optical image stabilization during capture of the image.

According to various, but not necessarily all, embodiments of the invention there is provided a method comprising: using a residual optical adjustment to obtain a captured image, wherein the residual optical adjustment depends upon a difference between a determined target optical adjustment determined as a target for achieving optical image stabilization and a measured optical adjustment, achieved as a consequence of optical image stabilization during capture of the image.

According to various, but not necessarily all, embodiments of the invention there is provided an apparatus comprising: at least one processor; and at least one memory including computer program code the at least one memory and the computer program code configured to, with the at least one processor, cause the apparatus at least to perform: using a residual optical adjustment to obtain a captured image, wherein the residual optical adjustment depends upon a difference between a determined target optical adjustment determined as a target for achieving optical image stabilization and a measured optical adjustment, achieved as a consequence of optical image stabilization during capture of the image.

BRIEF DESCRIPTION

For a better understanding of various examples that are useful for understanding the detailed description, reference will now be made by way of example only to the accompanying drawings in which.

DETAILED DESCRIPTION

Figure 1:
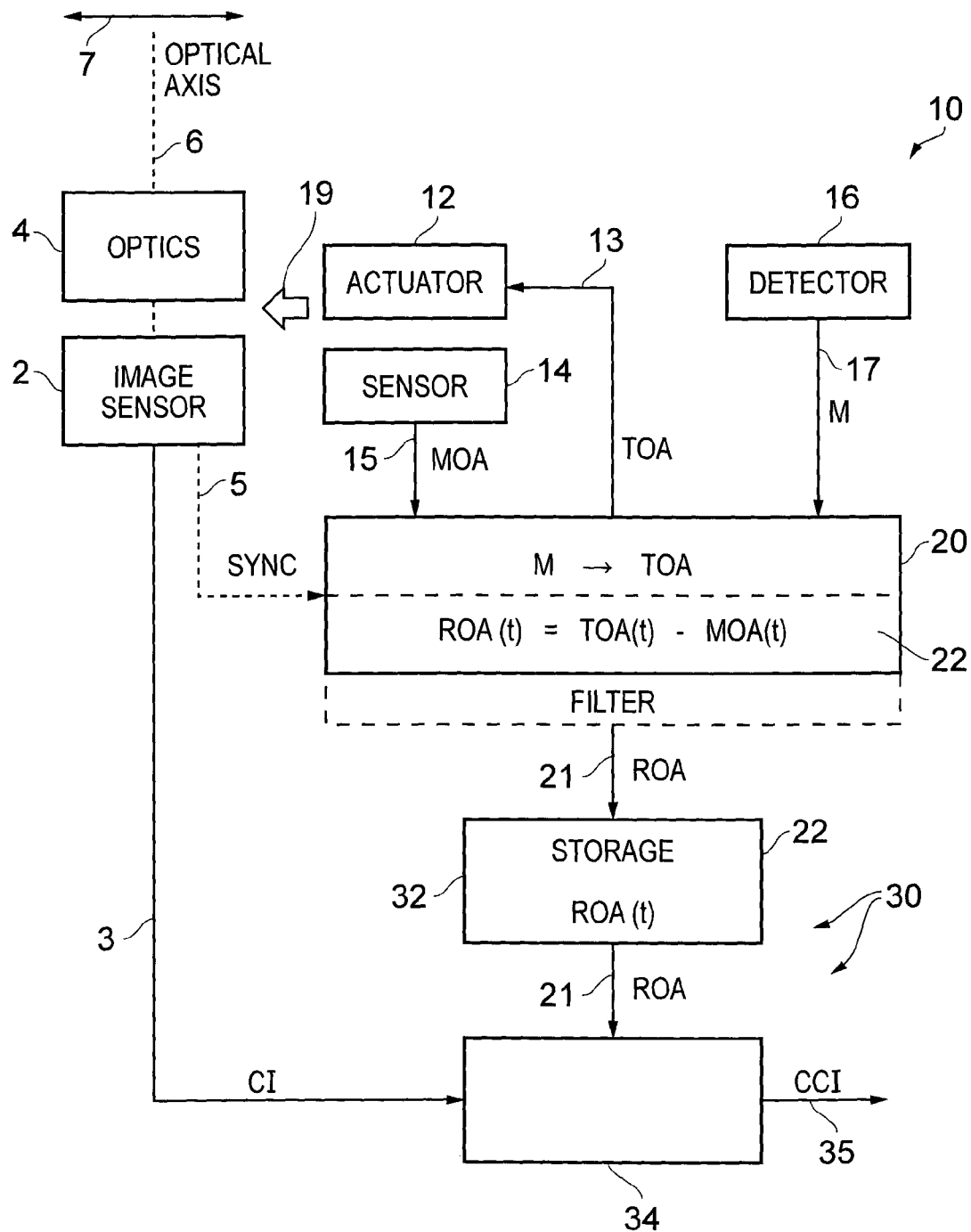
FIG. 1 illustrates an example of an apparatus for compensating for movement of the apparatus while the apparatus captures an image.

The Figures illustrate an apparatus 10 comprising: an image sensor 2 configured to capture an image 3 and optics 4, wherein the image sensor 2 and optics 4 align along an optical axis 6; optical image stabilization circuitry 20 configured to determine and apply a target optical adjustment 13 to compensate during capture of an image, for movement of the optical axis 6 as a consequence of detected movement of the apparatus 10; and post-capture image stabilization circuitry 30 configured to process the captured image 3 using a residual optical adjustment 21 to obtain a compensated captured image 35, wherein the residual optical adjustment 21 depends upon a difference between a measured optical adjustment 15, achieved during capture of the image, and the determined target optical adjustment 13.

FIG. 1 illustrates an example of an apparatus 10 for compensating for movement of the apparatus 10 while the apparatus 10 captures an image 3.

The apparatus 10 uses optical image stabilization (OIS) to apply an initial compensation and residual post-capture image stabilization (RPCIS) to apply, subsequently, a residual compensation.

The combination of initial optical image stabilization and residual post-capture image stabilization compensates for movement of the apparatus while the apparatus 10 captures an image 3.

The residual post-capture image stabilization provides the image stabilization, not provided by the optical image stabilization during capture of the image 3 but needed to compensate for movement of the apparatus 10 while the apparatus 10 captures an image 3.

The residual post-capture image stabilization is determined based on a physical measurement of the optical image stabilization actually provided during capture of the image 3. The residual post-capture image stabilization is dependent upon a difference between the intended optimum optical image stabilization calculated to compensate for movement of the apparatus 10 while the apparatus 10 captures an image 3 and the measured optical image stabilization actually achieved during capture of the image 3. The residual post-capture image stabilization is an error value representing a real-time difference between what was intended to be provided and what was actually provided.

The apparatus 10 comprises imaging components that are used to capture an image 3. The imaging components comprise at least an image sensor 2 configured to capture an image 3 of a scene 7 and optics 4. The image sensor 2 and optics 4 are aligned along an optical axis 6, so that the optics focuses the scene 7 onto the image sensor 2.

The apparatus 10 comprises optical image stabilization circuitry 20 configured to determine and apply a target optical adjustment 13 to compensate during capture of an image 3, for movement of the optical axis 6 as a consequence of detected movement of the apparatus 10.

The target optical adjustment 13 is calculated to compensate, preferably fully compensate, for movement of the apparatus 10 while the apparatus 10 captures an image 3.

The apparatus 10 also comprises control circuitry 30. In this example the control circuitry 30 is post-capture image stabilization circuitry 30 configured to process the captured image 3 using a residual optical adjustment 21 to obtain a compensated captured image 35. The residual optical adjustment 21 depends upon a difference between a measured optical adjustment 15, achieved during capture of the image, and the determined target optical adjustment 13.

The post-capture image stabilization circuitry 30 may use electronic image stabilization and/or digital image stabilization, and/or any other stabilization compensation on an already captured image.

The apparatus 10 comprises a movement detector device 16 configured to detect movement of the apparatus 10. It produces a vector 17 comprising a plurality of components dependent upon the movement of the apparatus 10.

As an example, the movement detector device may be a rotation detector. A rotation detector device may detect pitch rotation about a first axis of the apparatus 10 and yaw rotation about a second axis of the apparatus 10. The first and second axes are orthogonal. The first axis may be aligned with a width of a (rectangular) captured image 3 and the second axis is aligned with a height of the (rectangular) captured image 3. One example of a rotation detector is a gyroscope but other movement detector devices 16 may be used.

The output 17 from the movement detector device 16 is processed by the optical image stabilization circuitry 20 to determine a target optical adjustment 13. The target optical adjustment 13 is calculated to compensate during capture of the image 3, for movement of the optical axis 6 as a consequence of detected movement of the apparatus 10.

The optical image stabilization circuitry 20 is configured to apply the target optical adjustment 13 by moving the optical axis 6 relative to a scene 7 to be captured during capture of the image 3. For example, the optical image stabilization circuitry 20 may be configured to control one or more actuators 12 to apply the target optical adjustment 13 by physically moving the optical axis 6 relative to a scene to be captured 7 during capture of the image 3.

The one or more actuators may, depending on implementation, move the optics 4 (without moving the image sensor), or move the image sensor 2 (without moving the optics 4) or move both the optics 4 and the image sensor 2. The movement may involve a change in position and/or orientation.

The optical adjustment that is actually achieved as a consequence of physically moving the optical axis 6, the physical optical adjustment, may be different to the target optical adjustment 13 because of, for example, the dynamic response of the actuators 12 to commands.

As an example, if the movement detector device 16 detects and outputs a pitch rotation P° about a first axis of the apparatus 10 and a yaw rotation Y° about a second axis of the apparatus 10, then movement of the optical axis 6 may be expressed as (P°, Y°).

The target optical adjustment 13 is then calculated as (−P°, −Y°) to compensate during capture of the image 3, for movement of the optical axis 6 as a consequence of detected movement (P°, Y°) of the apparatus 10.

If the optical axis 6 is accurately rotated about the first axis by −P° then the effect of rotating the apparatus 10 about the first axis by P° is cancelled. If the optical axis is accurately rotated about the second axis by −Y° then the effect of rotating the apparatus 10 about the second axis by Y° is cancelled.

The optical image stabilization circuitry 20 may be configured to control a first actuator 12 to attempt to rotate physically the optical axis about the first axis by −P° during capture of the image in response to the target optical adjustment 13 and to control a second actuator 12 to attempt to rotate physically the optical axis about the second axis by −Y° during capture of the image in response to the target optical adjustment 13.

The apparatus 10 comprises one or more sensors 14 configured to measure, during capture of the image, the optical adjustment that is actually achieved as a consequence of physically moving the optical axis 6, the physical optical adjustment, which may be different to the intended target optical adjustment 13. The measured optical adjustment 15 is provided by the one or more sensors 14 to the optical image stabilization circuitry 20

Where the physical optical adjustment is different to the intended target optical adjustment 13, the physical optical adjustment partially, but not wholly, compensates during capture of the image 3 for movement of optical axis 6 as a consequence of the movement of the apparatus 10.

Residual optical adjustment circuitry 22 is configured to determine and store in a memory 32 a residual optical adjustment 21. The residual optical adjustment 21 depends upon a difference between a measured optical adjustment 15, achieved during capture of the image, and the determined target optical adjustment 13.

The residual optical adjustment 21 is an error value indicative of as yet uncompensated movement of the optical axis 6.

The residual optical adjustment 21 comprises both direction and magnitude.

The residual optical adjustment 21 may be recorded as simultaneous pairs of values of the measured optical adjustment 15 and the target optical adjustment 13 or as a difference between simultaneous pairs of values of the measured optical adjustment 15 and the target optical adjustment 13.

The residual optical adjustment 21 may be recorded in the memory 32 over a continuous period corresponding to a whole or part of the exposure period for capturing the image.

A filter 24 may optionally be used to filter the residual optical adjustment 21 before storage, only allowing residual optical adjustments 21 that exceed a threshold value to be stored in memory 32 during the exposure period for capturing the image.

The residual optical adjustment 21 may be stored in the memory 32 in a manner that records the temporal evolution of the residual optical adjustment 21 relative to the timing of an exposure period for capturing the image. This may, for example, be achieved by recording the residual optical adjustment 21 at regular time intervals from a beginning of the exposure period or may, for example, be achieved by recording the residual optical adjustment 21 in association with a time value that is dependent upon time elapsed from a beginning of the exposure period.

The image sensor 2 may provide one or more exposure period timing signals 5 to the residual optical adjustment circuitry 22. It may for example, send a signal indicating a start of an exposure period and also send a signal indicating an end of the exposure period. The exposure period timing signal 5 maintains synchronization between the image capturing process and the post-capture image stabilization process.

The exposure period may be determined as a fixed value before image capture starts and be independent of the post-capture image stabilization process.

The residual optical adjustment 21 is subsequently used by processing circuitry 34 to obtain a compensated captured image 35 via, for example, digital processing.

The post-capture image stabilization circuitry 30 performs post-capture image processing using processing circuitry 34. For example, the residual optical adjustment may be used to determine a point spread function (PSF). The PSF is then used to create an 'ideal' stabilized image using image deconvolution to transform the captured image 3 to an estimate of an ideal image, the compensated captured image 35. Algorithms for the deconvolution process are known to those skilled in the art.

Figure 2:
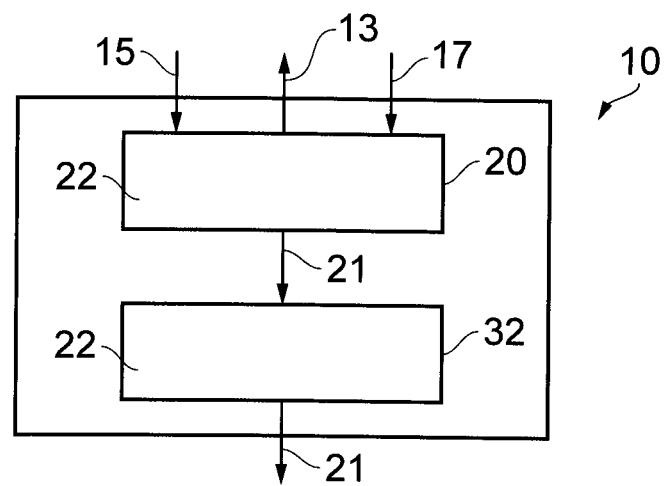
FIG. 2 illustrates an example of an apparatus that performs some but not all of the functions performed by the apparatus described with reference to FIG. 1.

FIG. 2 illustrates an example of an apparatus 10, that performs some but not all of the functions performed by the apparatus 10 described with reference to FIG. 1. In this example, at least the post-capture image processing using processing circuitry 34 is not performed by the apparatus 2.

Figure 3:
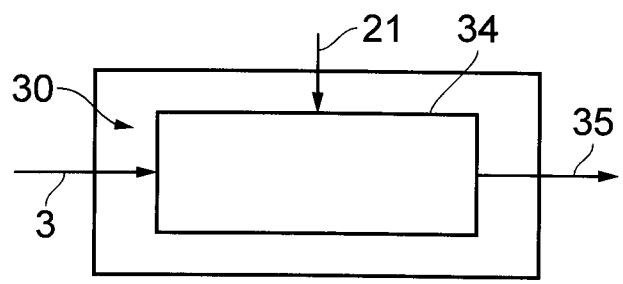
FIG. 3 illustrates an example of an apparatus that performs some but not all of the functions performed by the apparatus described with reference to FIG. 1.

FIG. 3 illustrates an example of an apparatus 10, that performs some but not all of the functions performed by the apparatus 10 described with reference to FIG. 1. It may operate with, but be separate to, the apparatus 10 illustrated in FIG. 2. For example, the apparatus 10 in FIG. 3 may perform the post-capture image processing using processing circuitry 34 that is not performed by the apparatus 2 of FIG. 2.

Referring to FIG. 2, the apparatus 10 functions as a pre-image processing apparatus. It comprises: optical image stabilization circuitry 20 configured to determine and apply a target optical adjustment 13 to compensate during capture of an image of a scene, for relative movement of an image sensor as a consequence of detected movement 17; and residual optical adjustment circuitry 22 configured to determine and store, in memory 32, a residual optical adjustment 21 for obtaining a compensated captured image 35 via processing, wherein the residual optical adjustment 21 depends upon a difference between a measured optical adjustment 15, achieved during capture of the image, and the determined target optical adjustment 13.

The apparatus 10 illustrated in FIG. 2 may, for example, be embodied as a chipset comprising processing circuits and memory.

Referring to FIG. 3, the apparatus 10 functions as an image processing apparatus. It comprises: processing circuitry 34 configured to process a captured image 3 using a residual optical adjustment 21 to obtain a compensated captured image 35, wherein the residual optical adjustment 21 depends upon a difference between a determined target optical adjustment 13 determined as a target for achieving optical image stabilization and a measured optical adjustment 15, achieved as a consequence of optical image stabilization during capture of the image.

Figure 4:
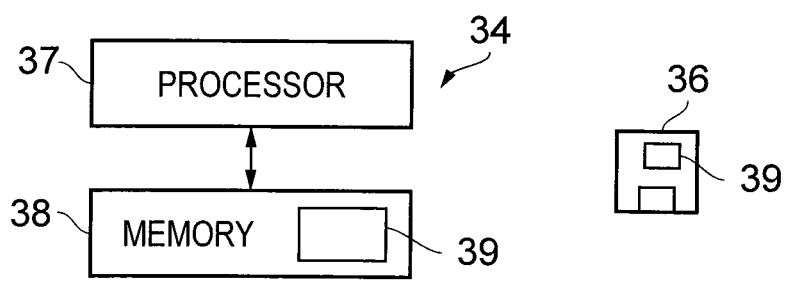
FIG. 4 illustrates an example of how the processing circuitry may be enabled.

FIG. 4 illustrates an example of how the processing circuitry 34 may be enabled, although other implementations are possible. In this implementation, the processing circuitry 34 comprises a processor 37 and a memory 38.

The processing circuitry 34 may be implemented using instructions that enable hardware functionality, for example, by using executable computer program instructions in a general-purpose or special-purpose processor that may be stored on a computer readable storage medium (disk, memory etc) to be executed by such a processor.

The processor 37 is configured to read from and write to the memory 38. The processor 37 may also comprise an output interface via which data and/or commands are output by the processor 37 and an input interface via which data and/or commands are input to the processor 37.

The memory 38 stores a computer program 39 comprising computer program instructions (computer program code) that controls the operation of the apparatus 10 when loaded into the processor 37. The computer program instructions, of the computer program 39, provide the logic and routines that enables the apparatus to perform at least some of the methods illustrated in FIG. 4. The processor 37 by reading the memory 38 is able to load and execute the computer program 39.

The apparatus therefore comprises: at least one processor 37; and at least one memory 38 including computer program code 39, the at least one memory 38 and the computer program code 39 configured to, with the at least one processor 37, cause the apparatus 10 at least to perform:

processing a captured image 3 using a residual optical adjustment 21 to obtain a compensated captured image 35, wherein the residual optical adjustment depends upon a difference between a determined target optical adjustment 13 determined as a target for achieving optical image stabilization and a measured optical adjustment 15, achieved as a consequence of optical image stabilization during capture of the image 3.

The computer program 39 may arrive at the apparatus 10 via any suitable delivery mechanism 36. The delivery mechanism 36 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 39. The delivery mechanism may be a signal configured to reliably transfer the computer program 39. The apparatus 10 may propagate or transmit the computer program 39 as a computer data signal.

Although the memory 38 is illustrated as a single component it may be implemented as one or more separate components some or all of which may be integrated/removable and/or may provide permanent/semi-permanent/dynamic/cached storage.

Although the processor 37 is illustrated as a single component it may be implemented as one or more separate components some or all of which may be integrated/removable.

Figure 5:
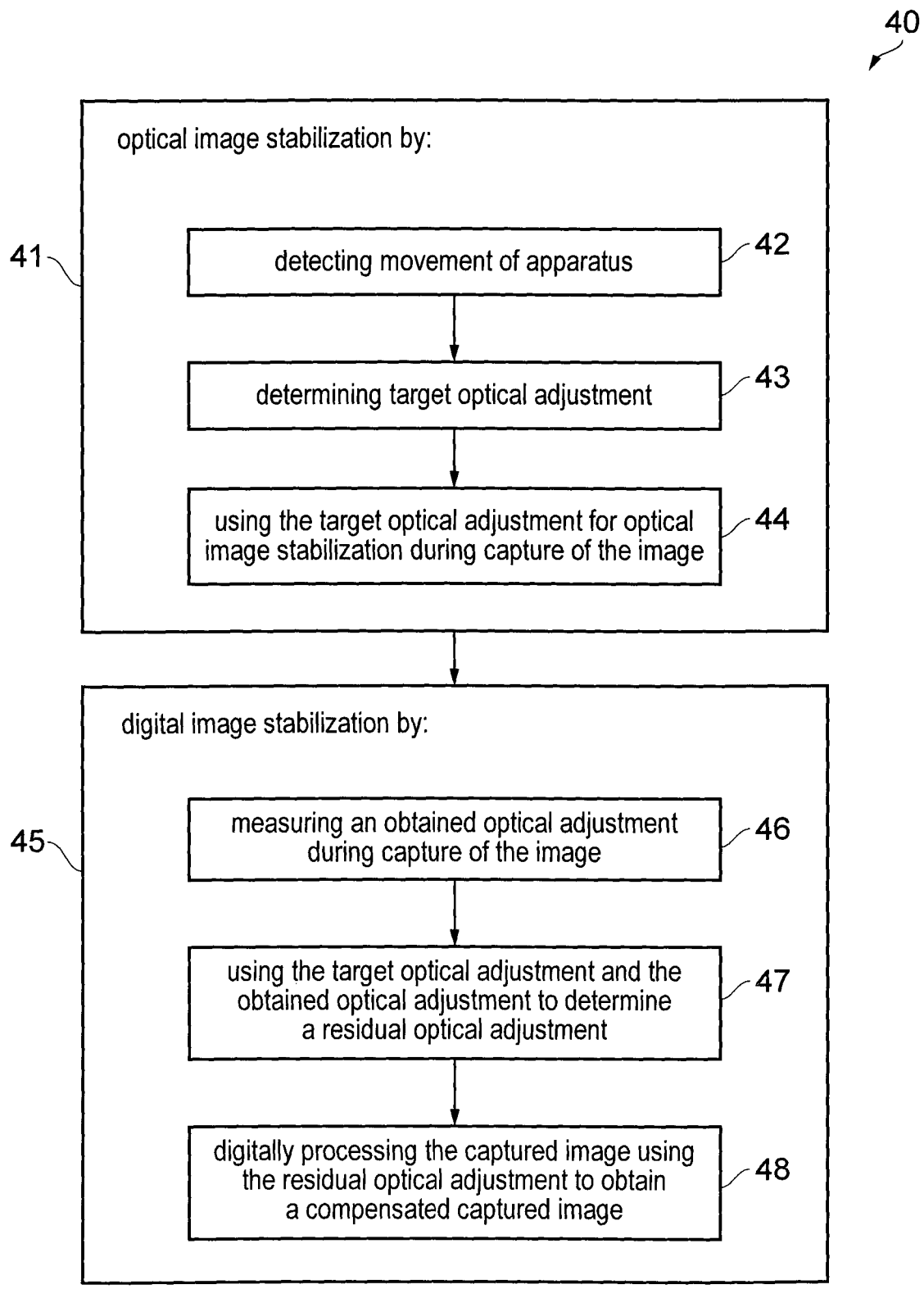
FIG. 5 illustrates an example of a method 40 for correcting a digital image to compensate for motion of the capturing apparatus during capture of the image.

FIG. 5 illustrates an example of a method 40 for correcting a digital image to compensate for motion of the capturing apparatus during capture of the image.

The method 40 uses optical image stabilization (OIS) 41 to apply an initial compensation and residual post-capture image stabilization (RPCIS) 45 to apply a residual compensation.

The combination of initial optical image stabilization 41 and residual post-capture image stabilization 45 compensates for movement of the capturing apparatus while the capturing apparatus captures an image 3.

The residual post-capture image stabilization 45 provides the image stabilization, not provided by the optical image stabilization 41 during capture of the image 3 but needed to compensate for movement of the capturing apparatus while the capturing apparatus captures an image 3.

The residual post-capture image stabilization is determined based on a physical measurement of the optical image stabilization actually provided during capture of the image 3 The residual post-capture image stabilization is dependent upon a real-time difference between the measured optical image stabilization actually provided during capture of the image 3 and the optimum optical image stabilization calculated to compensate for movement of the apparatus 10 while the apparatus 10 captures an image 3.

Referring back to FIG. 1, the measured optical image stabilization actually provided during capture of the image 3 is labelled 15 and the optimum optical image stabilization calculated to compensate for movement of the apparatus 10 while the apparatus 10 captures an image 3 is labelled 13.

The method 40, in the example of FIG. 5, comprises:
at block 41 performing optical image stabilization by:
at sub-block 42, detecting movement of apparatus 10;
at sub-block 43, determining a target optical adjustment 13 to compensate during capture of an image, for relative movement of the optical axis 6 as a consequence of the detected movement of the apparatus 10;
at sub-block 44, using the target optical adjustment 13 during capture of the image;
and then
at block 45 performing post-capture image stabilization by:
at sub-block 46, measuring an obtained optical adjustment that at least partially compensates during capture of an image for relative movement of optical axis 6 as a consequence of the movement of the apparatus 10;
at sub-block 47, using the target optical adjustment 13 and the obtained optical adjustment to determine and store a residual optical adjustment 21 indicative of a difference between the target optical adjustment 13 and the obtained optical adjustment; and
at sub-block 48, processing the captured image 3 using the residual optical adjustment 21 to obtain a compensated captured image 35.

Referring back to FIG. 2, the apparatus 10 in that example performs sub-blocks 43, 44, 46 and 47.

Referring back to FIG. 3 or 4, the apparatus 10 in that example performs sub-block 48.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network "device."

As used here 'module' refers to a unit or apparatus that excludes certain parts/components that would be added by an end manufacturer or a user.

The apparatus 10 illustrated in FIG. 1 may be a module or parts of it may be modules, the apparatus 10 illustrated in FIG. 2 may be a module, the apparatus 10 illustrated in FIG. 3 may be a module.

The blocks illustrated in the FIG. 4 may represent steps in a method and/or sections of code in the computer program or programs. The illustration of a particular order to the blocks does not necessarily imply that there is a required or preferred order for the blocks and the order and arrangement of the block may be varied. Furthermore, it may be possible for some blocks to be omitted.

In the above described examples, and the following examples, the apparatus 10 may comprise: an image sensor 2 configured to capture an image 3 and optics 4, wherein the image sensor 2 and optics 4 align along an optical axis 6; optical image stabilization circuitry 20 configured to determine and apply a target optical adjustment 13 to compensate during capture of an image, for movement of the optical axis 6 as a consequence of detected movement of the apparatus 10; and control circuitry 30 configured to use a residual optical adjustment 21 to obtain a captured image 35, wherein the residual optical adjustment 21 depends upon a difference between a measured optical adjustment 15, achieved during capture of the image, and the determined target optical adjustment 13.

In the above described examples, the control circuitry 30 configured to use a residual optical adjustment 21 to obtain a captured image 35, is post-capture image stabilization circuitry 30 configured to process the captured image 3 using a residual optical adjustment 21 to obtain a compensated captured image 35. However, in the embodiments described below other examples of control circuitry 30 are described.

In the above described examples, and the following examples, the method 40 may comprise: performing 41 optical image stabilization by: detecting 42 movement of apparatus 10; determining 43 target optical adjustment 13 to compensate during capture of an image, for relative movement of the optical axis 6 as a consequence of the detected movement of the apparatus 10; using 44 the target optical adjustment 13 during capture of the image; and measuring 46 an obtained optical adjustment that at least partially compensates during capture of an image for relative movement of the optical axis 6 as a consequence of the movement of the apparatus 10; using 47 the target optical adjustment 13 and the obtained optical adjustment to determine a residual optical adjustment 21 indicative of a difference between the target optical adjustment 13 and the obtained optical adjustment; and using 48 the residual optical adjustment 21 to obtain a captured image 35.

In the above described examples, and the following examples, the apparatus may comprise: circuitry 34 configured to use a residual optical adjustment 21 to obtain a captured image, wherein the residual optical adjustment 21 depends upon a difference between a determined target optical adjustment 13 determined as a target for achieving optical image stabilization and a measured optical adjustment 15, achieved as a consequence of optical image stabilization during capture of the image.

In the above described examples, the circuitry 34 configured to use a residual optical adjustment 21 to obtain a captured image 35, is digital image processing circuitry 34 configured to process the captured image 3 using a residual optical adjustment 21 to obtain a compensated captured image 35. However, in the embodiments described below other examples of circuitry 34 are described. In these examples, the circuitry 34 may be provided by processing circuitry 34 as previously described, for example, with reference to FIG. 4.

In the above described examples, and the following examples, the method may comprise: using 48 a residual optical adjustment 21 to obtain a captured image 35, wherein the residual optical adjustment 21 depends upon a difference between a determined target optical adjustment 13 determined as a target for achieving optical image stabilization and a measured optical adjustment, achieved as a consequence of optical image stabilization during capture of the image 35.

In the above described examples, and the following examples, the apparatus 10 may comprise: at least one processor 37; and at least one memory 38 including computer program code 39, the at least one memory 38 and the computer program code 39 configured to, with the at least one processor 37, cause the apparatus 10 at least to perform: using a residual optical adjustment 21 to obtain a captured image 35, wherein the residual optical adjustment 21 depends upon a difference between a determined target optical adjustment 13 determined as a target for achieving optical image stabilization and a measured optical adjustment 15, achieved as a consequence of optical image stabilization during capture of the image.

The above-described embodiments use the residual optical adjustment 21 to obtain a captured image 35, post-capture of the image. For example, the control circuitry 30 may be configured to use the residual optical adjustment 21 to determine, post-capture, an optimal image 35, wherein the residual optical adjustment 21 depends upon a difference between a measured optical adjustment 15, achieved during capture of the image, and the determined target optical adjustment 13.

In the examples described above, the control circuitry 30 is configured to use the residual optical adjustment after capture of the image to process the captured image to obtain a compensated captured image. The control circuitry 30 is post-capture image stabilization circuitry 30 configured to process the captured image 3 using a residual optical adjustment 21 to obtain a compensated captured image 35, wherein the residual optical adjustment depends upon a difference between a measured optical adjustment 15, achieved during capture of the image, and the determined target optical adjustment 13.

However, the residual optical adjustment 21 may be used to obtain a captured image 35, post-capture of the image 3 in different ways. For example, the control circuitry 30 may be configured to use the recorded residual optical adjustment 21 after capture of the image to select the image as a preferred image from a plurality of captured images. In this example, the residual optical adjustment 21 is a decision parameter, used to select a particular capture time for the captured image i.e. it selects, post-capture, from multiple images captured at different times a particular image which has been captured at a particular time. That selection uses the residual optical adjustment recorded for that image. That particular image may, for example, be the 'best' or 'satisfactory' according to an assessment criterion dependent upon the recorded residual optical adjustments 21 for the images. In this scenario, the particular capture time is determined post-capture.

As an alternative to using the residual optical adjustment 21 to obtain a captured image 35, post-capture of the image, the residual optical adjustment 21 may be used, at the time of capturing the image 3, to decide when to obtain a captured image 3. The image may, for example, be captured when a stability criterion is satisfied e.g. after the effective motion (as measured by the residual optical adjustment) is below a threshold. For example, the instantaneous residual optical adjustment 21 may be compared against a threshold and/or a statistical measure (e.g. mean and variance) over a short time window may be compared against a threshold. The threshold(s) may be dependent upon exposure time. Once capture has started it may continue without modification as planned.

In this example, the residual optical adjustment 21 is a decision parameter, used to select a particular capture time for the captured image i.e. it selects, at-capture, from multiple putative images that could be captured at different times a particular image which is then captured at a particular time. That selection uses the residual optical adjustment 21, which may be contemporaneous. That particular image may, for example, be expected to be the 'best' or 'satisfactory' according to a stability assessment criterion dependent upon the residual optical adjustment 21. In this scenario, the particular capture time is determined at-capture.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   an image sensor configured to capture an image and optics, wherein the image sensor and optics align along an optical axis;
   optical image stabilization circuitry configured to determine and apply a target optical adjustment to compensate during capture of an image, for movement of the optical axis as a consequence of detected movement of the apparatus, wherein the target optical adjustment is a physical adjustment along the optical axis; and
   post-capture image stabilization circuitry configured to process the captured image using a residual optical adjustment to obtain a compensated captured image, wherein the residual optical adjustment depends upon a difference between a measured optical adjustment, achieved during capture of the image, and the determined target optical adjustment.

2. An apparatus as claimed in claim 1, comprising at least one sensor configured to measure, during capture of the image, a physical optical adjustment as a consequence of applying the target optical adjustment.

3. An apparatus as claimed in claim 1, wherein the residual optical adjustment comprises both direction and magnitude.

4. An apparatus as claimed in claim 1 comprising digital image stabilization circuitry configured to image process the captured image using the residual optical adjustment to obtain a compensated captured image.

5. An apparatus as claimed in claim 1, wherein the optical image stabilization circuitry is configured to apply the target optical adjustment by moving the optical axis relative to a scene to be captured during capture of the image.

6. An apparatus as claimed in claim 5, wherein the optical image stabilization circuitry comprises at least one actuator configured to apply the target optical adjustment by physically moving the optical axis relative to a scene to be captured during capture of the image.

7. An apparatus as claimed in claim 1, comprising a movement detector device configured to detect movement of the apparatus.

8. An apparatus as claimed in claim 7, wherein the optical image stabilization circuitry is configured to determine a target optical adjustment using the output from the movement detector device, wherein the target optical adjustment compensates for the detected movement of the apparatus.

9. An apparatus as claimed in claim 1, comprising residual optical adjustment circuitry configured to determine and store the residual optical adjustment, wherein the residual optical adjustment depends upon a difference between a measured optical adjustment, achieved during capture of the image, and the determined target optical adjustment.

10. An apparatus as claimed in claim 9, wherein the residual optical adjustment circuitry configured to determine and store the residual optical adjustment, is configured to store the residual optical adjustment in a manner that records the temporal evolution of the residual optical adjustment signal relative to the timing of an exposure period for capturing the image.

11. An apparatus as claimed in claim 9, wherein the image sensor provides at least one exposure period timing signal to the residual optical adjustment circuitry.

12. An apparatus as claimed in claim 11, wherein the exposure period is determined before image capture starts.

13. An apparatus as claimed in claim 9, wherein the residual optical adjustment circuitry configured to determine and store the residual optical adjustment, is configured to determine and store the residual optical adjustment over a continuous period corresponding to at least a portion of the exposure period for capturing the image.

14. An apparatus as claimed in claim 13, wherein the residual optical adjustment circuitry configured to determine and store the residual optical adjustment, is configured to determine and store the residual optical adjustment over a continuous period corresponding to the exposure period for capturing the image.

15. An apparatus as claimed in claim 13, wherein the residual optical adjustment circuitry configured to determine and store the residual optical adjustment, is configured to determine the residual optical adjustment during the exposure period for capturing the image and is configured to store the residual optical adjustment over a continuous period, during the exposure period for capturing the image, when the residual optical adjustment exceeds a threshold value.

16. A method comprising:
   performing optical image stabilization by:
   detecting movement of apparatus
   determining target optical adjustment to compensate during capture of an image, for relative movement of the optical axis as a consequence of the detected movement of the apparatus, wherein the target optical adjustment is a physical adjustment along the optical axis;
   using the target optical adjustment during capture of the image and then performing post-capture image stabilization by:
   measuring an obtained optical adjustment that at least partially compensates during capture of an image for relative movement of the optical axis as a consequence of the movement of the apparatus;
   using the target optical adjustment and the obtained optical adjustment to determine a residual optical adjustment indicative of a difference between the target optical adjustment and the obtained optical adjustment; and
   processing the captured image using the residual optical adjustment to obtain a compensated captured image.

17. A method as claimed in claim 16 further comprising performing any of the functions enabled by the apparatus which comprises
   an image sensor configured to
   capture an image and optics, wherein the image sensor and optics align along an optical axis;
   optical image stabilization circuitry configured to determine and apply a target optical adjustment to compensate during capture of an image, for movement of the optical axis as a consequence of detected movement of the apparatus;

post-capture image stabilization circuitry configured to process the captured image using a residual optical adjustment to obtain a compensated captured image, wherein the residual optical adjustment depends upon a difference between a measured optical adjustment, achieved during capture of the image, and the determined target optical adjustment.

18. An apparatus comprising:

optical image stabilization circuitry configured to determine and apply a target optical adjustment to compensate during capture of an image of a scene, for relative movement of an image sensor as a consequence of detected movement, wherein the target optical adjustment is a physical adjustment along the optical axis; and residual optical adjustment circuitry configured to determine and store a residual optical adjustment for obtaining a compensated captured image via processing, wherein the residual optical adjustment depends upon a difference between a measured optical adjustment, achieved during capture of the image, and the determined target optical adjustment.

19. A method comprising:

determining and applying a target optical adjustment to compensate during capture of an image of a scene, for relative movement of an image sensor as a consequence of detected movement, wherein the target optical adjustment is a physical adjustment along the optical axis; and determining and storing a residual optical adjustment for obtaining a compensated captured image via post-capture processing, wherein the residual optical adjustment depends upon a difference between a measured optical adjustment, achieved during capture of the image, and the determined target optical adjustment.

20. An apparatus comprising:

an image sensor configured to capture an image and optics, wherein the image sensor and optics align along an optical axis ;

optical image stabilization circuitry configured to determine and apply a target optical adjustment to compensate during capture of an image, for movement of the optical axis as a consequence of detected movement of the apparatus, wherein the target optical adjustment is a physical adjustment along the optical axis; and control circuitry configured to use a residual optical adjustment to obtain a captured image, wherein the residual optical adjustment depends upon a difference between a measured optical adjustment, achieved during capture of the image, and the determined target optical adjustment.

21. An apparatus as claimed in claim 20, wherein the control circuitry is configured to use the residual optical adjustment to assist in determining a stability criterion that enables capture of an image.

22. An apparatus as claimed in claim 20, wherein the control circuitry is configured to use the residual optical use a residual optical adjustment to determine, post-capture, an optimal image, wherein the residual optical adjustment depends upon a difference between a measured optical adjustment, achieved during capture of the image, and the determined target optical adjustment.

23. An apparatus as claimed in claim 20, wherein the control circuitry is configured to use the residual optical adjustment after capture of the image to select the image as an optimal image from a plurality of captured images.

24. An apparatus as claimed in claim 20, wherein the control circuitry is configured to use the residual optical adjustment after capture of the image to process the captured image to obtain a compensated captured image.

25. An apparatus as claimed in claim 20, wherein the residual optical adjustment is a decision parameter, used to select a particular capture time for the captured image.

* * * * *